(12) United States Patent
Ohhashi

(10) Patent No.: US 8,645,711 B2
(45) Date of Patent: Feb. 4, 2014

(54) INFORMATION PROCESSOR, METHOD FOR VERIFYING AUTHENTICITY OF COMPUTER PROGRAM, AND COMPUTER PROGRAM PRODUCT

(75) Inventor: Naoya Ohhashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 814 days.

(21) Appl. No.: 12/256,666

(22) Filed: Oct. 23, 2008

(65) Prior Publication Data

US 2009/0132829 A1 May 21, 2009

(30) Foreign Application Priority Data

Nov. 21, 2007 (JP) ................................ 2007-301473

(51) Int. Cl.
*G06F 11/30* (2006.01)
*G06F 12/14* (2006.01)
*G06F 9/00* (2006.01)
*G06F 15/177* (2006.01)
*G06F 11/00* (2006.01)

(52) U.S. Cl.
USPC ............... 713/187; 713/2; 713/188; 713/189; 714/36

(58) Field of Classification Search
USPC ................... 713/187, 1–2, 164, 194
See application file for complete search history.

(56) References Cited

U.S. PATENT DOCUMENTS

| | | | |
|---|---|---|---|
| 7,461,249 B1 * | 12/2008 | Pearson et al. ............... | 713/156 |
| 7,603,566 B2 * | 10/2009 | Hashimoto et al. ........... | 713/187 |
| 7,653,819 B2 * | 1/2010 | Bade et al. .................... | 713/187 |
| 7,725,703 B2 * | 5/2010 | Hunter et al. .................. | 713/2 |
| 2008/0077801 A1 * | 3/2008 | Ekberg .......................... | 713/187 |
| 2008/0301457 A1 * | 12/2008 | Uesugi et al. ................. | 713/178 |
| 2009/0086981 A1 * | 4/2009 | Kumar et al. ................. | 380/285 |

FOREIGN PATENT DOCUMENTS

| | | |
|---|---|---|
| JP | 2004-265286 | 9/2004 |
| JP | 2005-227995 | 8/2005 |
| JP | 2007-257197 | 10/2007 |

OTHER PUBLICATIONS

Japanese Office Action mailed Feb. 7, 2012 in Patent Application No. 2007-301473.

* cited by examiner

*Primary Examiner* — Kambiz Zand
*Assistant Examiner* — Feliciano Mejia
(74) *Attorney, Agent, or Firm* — Oblon, Spivak, McClelland, Maier & Neustadt, L.L.P.

(57) ABSTRACT

A disc stores therein a computer program and encrypted information. A BIOS is executed at the time of start-up and starts the computer program. A TPM is connected to the BIOS by a low-speed bus. The TPM includes a register for storing data. A blob stores therein true hash values of the computer program and the BIOS in advance. The BIOS includes a hash value calculating unit that calculates hash values of the computer program and the BIOS and stores those hash values in the register. The TPM compares the hash values stored in the register with the hash values stored in the blob and decrypts information in the blob if the hash values agree with each other.

7 Claims, 17 Drawing Sheets

INFORMATION PROCESSOR, METHOD FOR VERIFYING AUTHENTICITY OF COMPUTER PROGRAM, AND COMPUTER PROGRAM PRODUCT

CROSS-REFERENCE TO RELATED APPLICATIONS

The present application claims priority to and incorporates by reference the entire contents of Japanese priority document 2007-301473 filed in Japan on Nov. 21, 2007.

BACKGROUND OF THE INVENTION

1. Field of the Invention

The present invention relates to a technology for verifying the authenticity of a computer program before staring the computer program.

2. Description of the Related Art

Recently, an information processor such as a PC (Personal Computer) has a semiconductor chip (IC) called TPM (Trusted Platform Module) that is a hardware tamper resistant secure chip. The TPM includes a register for storing a hash value and it performs various functions. Those functions include a hash value calculating function for calculating a hash value of a computer program to be started based on a request from, for example, a BIOS (Basic Input/Output System) and storing the hash value in the register, a function for verifying the authenticity of a computer program, and a function of digital signature, electronic authentication and the like. The TPM aims to improve the security of the information processor by using these functions. A conventional technology can be found, for example, in Japanese Patent Application Laid-open No. 2005-227995.

In response to a requirement from market, currently the TPM is installed even in image forming apparatuses, such as copiers, to improve the security thereof. The TPM is advantageous in that it can detect not only an unauthorized tampering with software but also an unauthorized tampering with hardware thereby providing higher security.

Although the TPM offers higher security, it is typically connected to a low-speed bus so that it disadvantageously takes a longer time to calculate a hash value. Because the calculation of the hash value is performed during the information processor's start-up process, there is a problem that the start time is delayed.

SUMMARY OF THE INVENTION

It is an object of the present invention to at least partially solve the problems in the conventional technology.

According to an aspect of the present invention, there is provided an information processor including a first storage unit that stores therein a computer program to be started and encrypted information; a starting unit that is started when the information processor is started and starts the computer program; a security unit that is connected to the starting unit with a low-speed bus and has a register in which a hash value of the computer program can be stored; a processing unit that is executed as the computer program by the starting unit; and a second storage unit that stores therein the hash value of the computer program and a hash value of the starting unit in advance. The starting unit includes a first hash value calculating unit that performs a hash value calculating process for calculating hash values of the starting unit and the computer program and storing the hash values in the register of the security unit. The security unit compares the hash values stored in the register with the hash values stored in the second storage unit and decrypts the encrypted information if the hash values agree with each other.

According to another aspect of the present invention, there is provided a method for verifying an authenticity performed on an information processor. The information processor including a first storage unit that stores therein a computer program to be started and encrypted information; a starting unit that starts the computer program; a security unit that is connected to the starting unit with a low-speed bus and has a register in which a hash value of the computer program can be stored; and a second storage unit that stores therein the hash value of the computer program and a hash value of the starting unit in advance. The method including starting the computer program by the starting unit when the information processor is started; executing a processing unit as the computer program by the starting unit; performing a hash value calculating process for calculating hash values of the starting unit and the computer program and storing the hash values in the register of the security unit by the starting unit; and comparing the hash values stored in the register with the hash values stored in the second storage unit and decrypting the encrypted information if the hash values agree with each other by the security unit.

According to still another aspect of the present invention, there is provided a computer program product that realizes the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. An example of an information processor as an image forming apparatus with a TPM is described below. The TPM is provided to enhance the security of the information processor. This invention can be applied to any apparatus that includes a TPM.

An image forming apparatus 100 according to a first embodiment has a hash calculating function in a BIOS, in addition to a hash calculating function in a TPM, and reduces a processing time for calculating a hash value by using the hash calculating function in the BIOS.

Figure 1:
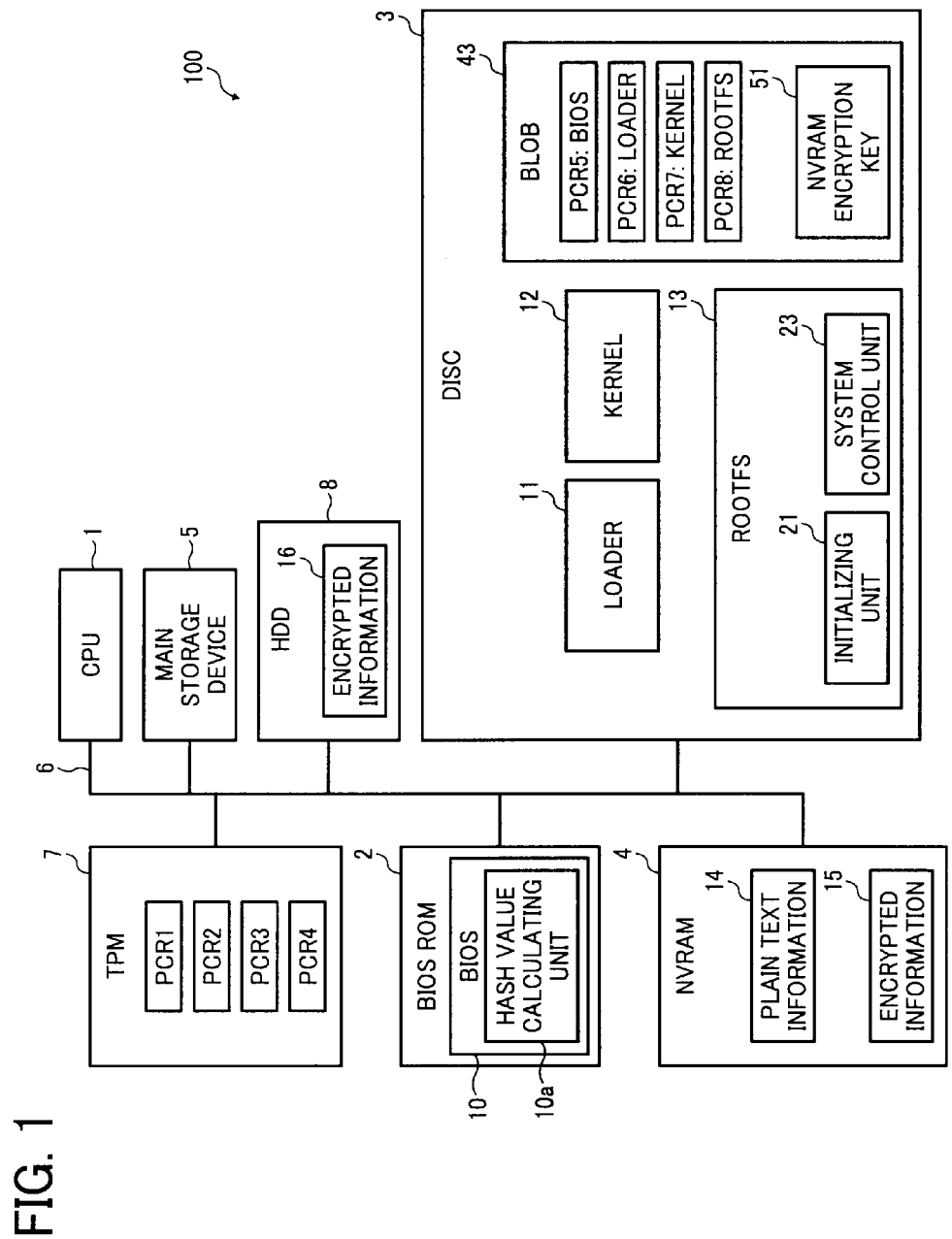
FIG. 1 is a block diagram of an image forming apparatus according to a first embodiment of the present invention.

FIG. 1 is a block diagram of the image forming apparatus 100. The image forming apparatus 100 includes a CPU 1, a BIOS ROM 2, a disc 3, a nonvolatile RAM (NVRAM) 4, a main storage device 5, a TPM 7, and a hard disc drive (HDD) 8. The CPU 1, the BIOS ROM 2, the disc 3, the NVRAM 4, the main storage device 5, the TPM 7, and the HDD 8 are connected to each other with a bus 6. The image forming apparatus 100 includes an operating unit and various engines used to form images and the like, but they are omitted in the FIG. 1.

The BIOS ROM 2 stores therein a BIOS 10 that is a computer program. The disc 3 stores therein a loader 11, a kernel 12, and a root file system (rootfs) 13 that are computer programs, respectively. The disc 3 stores therein a blob 43. Any recording media such as a SD (secure digital) card, a USB Flash memory, a NOR Flash memory can be used as the disc 3. The NVRAM 4 stores therein plain text information 14 and encrypted information 15 used by a user.

The TPM includes four platform configuration registers PCR1 to PCR4. The BIOS 10 has a hash value calculating unit 10a that performs a hash value calculating process for calculating a hash value of a computer program and storing the calculated hash values in the PCR1 to the PCR4 in the TPM 7. The computer program can be the BIOS 10, the loader 11, the kernel 12, and the root file system 13.

The root file system 13 controls an initializing unit 21 and a system control unit 23 stored in the disc 3. The computer program such as the BIOS 10, the loader 11, the kernel 12, and the root file system 13 is read into the main storage device 5 and then executed by the CPU 1. In the following explanation, the computer program such as the BIOS 10, the loader 11, the kernel 12, and the root file system 13 is taken as a subject of a process for the convenience of the explanation.

The blob 43 has an NVRAM encryption key 51 for encrypting the contents of the NVRAM 4. The blob 43 includes four platform configuration registers PCR5 to PCR8 that correspond to the registers PCR1 to PCR4 in the TPM 7. The blob 43 stores the hash values calculated for the BIOS 10, the loader 11, the kernel 12, and the root file system 13 in the PCR5 to PCR8. The HDD 8 stores therein encrypted information 16.

The initializing unit 21 is a computer program that is executed by the kernel 12 initially after the image forming apparatus is powered on. Execution of the initializing unit 21 leads to an initializing process for starting the system control unit 23, other application programs (not shown), and the like. The system control unit 23 is a computer program that controls the image forming apparatus. Such a control includes a control of another application for forming an image, a control of the operating unit (not shown), and a control of a resource.

Figure 2:
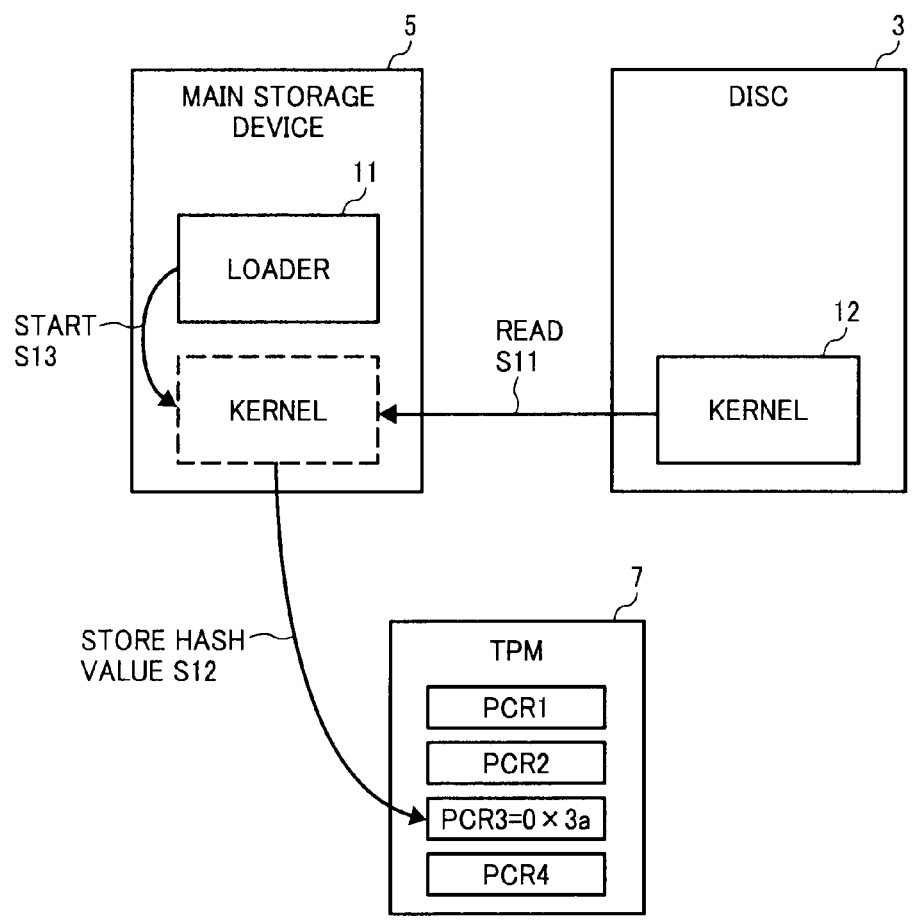
FIG. 2 is a schematic diagram for explaining outlines of a hash value calculating process and a hash value storing process performed by the image forming apparatus shown in FIG. 1.

FIG. 2 is a schematic diagram for explaining outlines of a hash value calculating process and a hash value storing process by the TPM 7. Workings of the TPM 7 are explained briefly. An example of starting the kernel 12 by the loader 11 is explained.

FIG. 2 is a schematic diagram of a processing procedure for storing the hash value in the TPM 7. At Step 11, the loader 11 reads the kernel 12 from the disc 3 into the main storage device 5. At Step 12, the TPM 7 calculates a hash value of the kernel 12 and stores the calculated hash value in the PCR1 to PCR4. The TPM 7 calculates the hash value of the kernel 12 by, although not limited to, generating a fixed-length pseudo random number from a plain text. In the example shown in FIG. 2, the hash value 0x3a of the kernel 12 is stored in the PCR3. At Step S13, the loader 11 starts the kernel 12.

As described above, when the TPM 7 starts the computer program, such as the BIOS 10, the loader 11, the kernel 12, and the root file system 13, the TPM 7 stores the hash value calculated from the computer program in the PCR1 to the PCR4.

Figure 3:
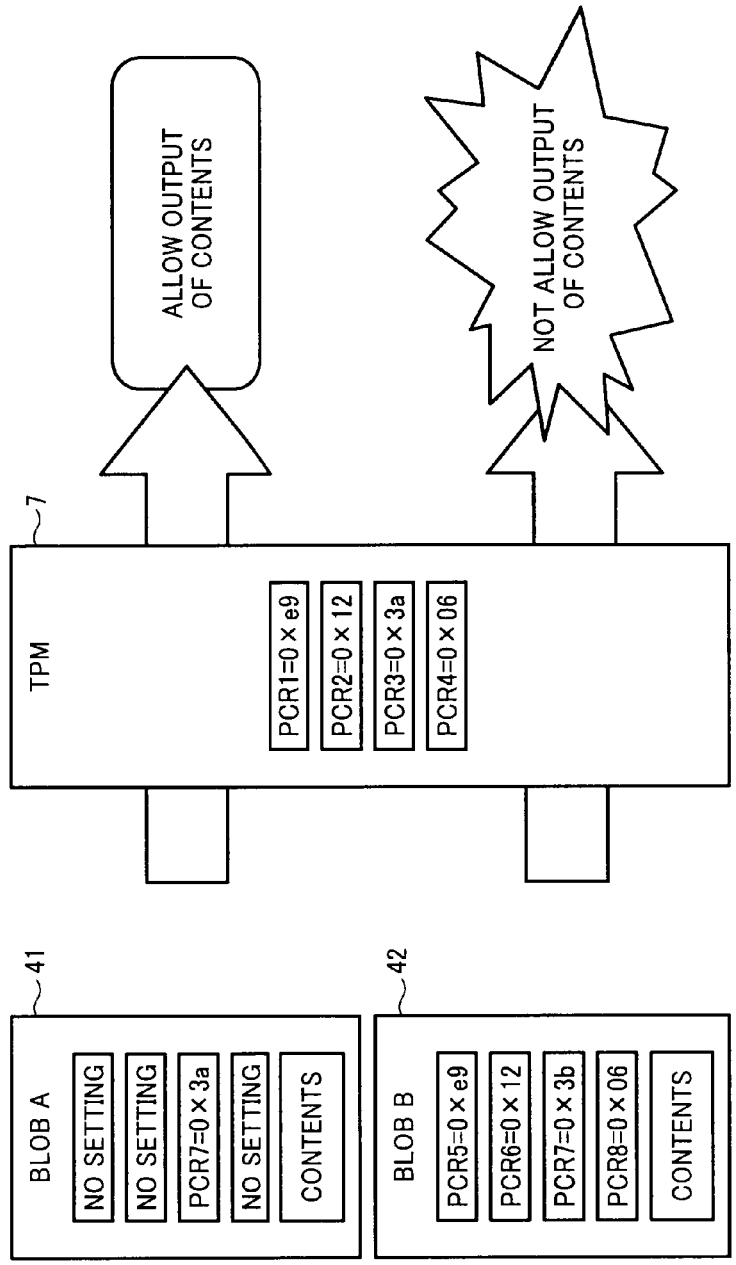
FIG. 3 is a schematic diagram of decoding of information with a TPM shown in FIG. 2.

FIG. 3 is a schematic diagram for explaining decoding of information with the TPM 7. Four hash values are stored in the PCR1 to the PCR4 of the TPM 7 when a module is started. In the encryption of information with the TPM 7, a blob A 41 and a blob B 42 are used. The blob A 41 and the blob B 42 include contents that are encrypted information, respectively. Moreover, the blob A 41 and the blob B 42 include four platform configuration registers PCR5 to PCR8 corresponding to the PCR1 to PCR4 of the TPM 7. A hash value stored in the PCR1 to the PCR4 of the TPM 7 is set in at least one of the registers PCR5 to PCR8 of each of the blob A 41 and the blob B 42.

In the example shown in FIG. 3, a hash value 0x3a is stored in the PCR7 of the blob A 41. Hash values 0xe9, 0x12, 0x3b, and 0x06 are stored in the PCR5 to the PCR8 of the blob B 42. Hash values 0xe9, 0x12, 0x3a, and 0x06 are stored in the PCR1 to the PCR4 of the TPM 7.

Because the same hash value is stored in the PCR7 of the blob A 41 and the PCR3 of the TPM 7, the TPM 7 allows output of the contents from the blob A 41. On the other hand, because the hash value stored in the PCR7 of the blob B 42 is different from that stored in the PCR3 of the TPM 7, the TPM 7 does not allow output of the contents from the blob B 42. When "no setting" is stored as in the registers other than the PCR7 of the blob A 41, the TPM 7 does not use the values in those registers as a criterion of a judgment whether the output of the contents is allowable.

A start sequence when the TPM 7 is operated in a conventional manner is explained with reference to FIGS. 4 and 5. In the following explanation with reference to FIGS. 4 and 5, a BIOS 410 having the same function as that in the conventional method is provided instead of the BIOS 10 of FIG. 1.

First, the BIOS 410 requests the TPM 7 to calculate a hash value of the BIOS 410 (Step S21). Next, the TPM 7 calculates the hash value of the BIOS 410 (Step S22), and sends the hash value back to the BIOS 410 (Step S23). The BIOS 410 stores the hash value in a register (for example, PCR1) corresponding to the BIOS 410 in the TPM 7 (Step S24).

The BIOS 410 reads the loader 11 from the disc 3 into the main storage device 5 (Step S25). The BIOS 410 requests the TPM 7 to calculate a hash value of the loader 11 (Step S26).

The TPM 7 calculates the hash value of the loader 11 (Step S27) and sends the hash value back to the BIOS 410 (Step S28). The BIOS 410 stores the hash value in a register (for example, PCR2) corresponding to the loader 11 in the TPM 7 (Step S29).

Then the BIOS 410 starts the loader 11 (Step S30). The loader 11 reads the kernel 12 from the disc 3 into the main storage device 5 (Step S31). The loader 11 executes a predetermined INT call provided by the BIOS 410 (Step S32). When the INT call is invoked, the BIOS 410 calculates a hash value of given predetermined information by using the TPM 7 and sends the hash value back to the invoker.

In response to the INT call, the BIOS 410 requests the TPM 7 to calculate a hash value of the kernel 12 (Step S33). The TPM 7 calculates the hash value of the kernel 12 (Step S34) and sends the hash value back to the BIOS 410 (Step S35). The BIOS 410 sends the hash value back to the loader 11 that is the invoker (Step S36). The loader 11 stores the hash value in the register (PCR3) corresponding to the kernel 12 in the TPM 7 (Step S37).

The loader 11 reads the root file system 13 from the disc 3 into the main storage device 5 (Step S38). The loader 11 requests the BIOS 410 to calculate a hash value of the root file system 13 with the INT call (Step S39).

In response to the INT call, the BIOS 410 requests the TPM 7 to calculate the hash value of the root file system 13 (Step S40). The TPM 7 calculates the hash value of the root file system 13 (Step S41) and sends the hash value back to the BIOS 410 (Step S42). The BIOS 410 sends the hash value back to the loader 11 that is the invoker (Step S43). The loader 11 stores the hash value in the register (PCR4) corresponding to the root file system 13 in the TPM 7 (Step S44).

As described above, the hash value of each computer program is stored in the corresponding PCR in the TPM 7.

The loader 11 starts the read kernel 12 (Step S45). Although it is not shown in the FIG. 5, the loader 11 also starts the read root file system 13.

The kernel 12 starts the initializing unit 21 in the root file system 13 (Step S46). The started initializing unit 21 starts the system control unit 23 (Step S47).

When the system control unit 23 reads out the encrypted information from the NVRAM 4, the system control unit 23 requests the TPM 7 to decode the blob 43 to obtain the NVRAM encryption key 51. In response to the request, the TPM 7 checks whether the hash values stored in the PCR agree with the hash value stored in the blob 43 (Step S48).

The system control unit 23 can obtain the NVRAM encryption key 51 from the blob 43 only when the hash values are judged to be in agreement with each other (Step S49). The system control unit 23 performs reading and writing the information in the NVRAM 4 by using the obtained NVRAM encryption key 51 (Step S50).

Figure 6:
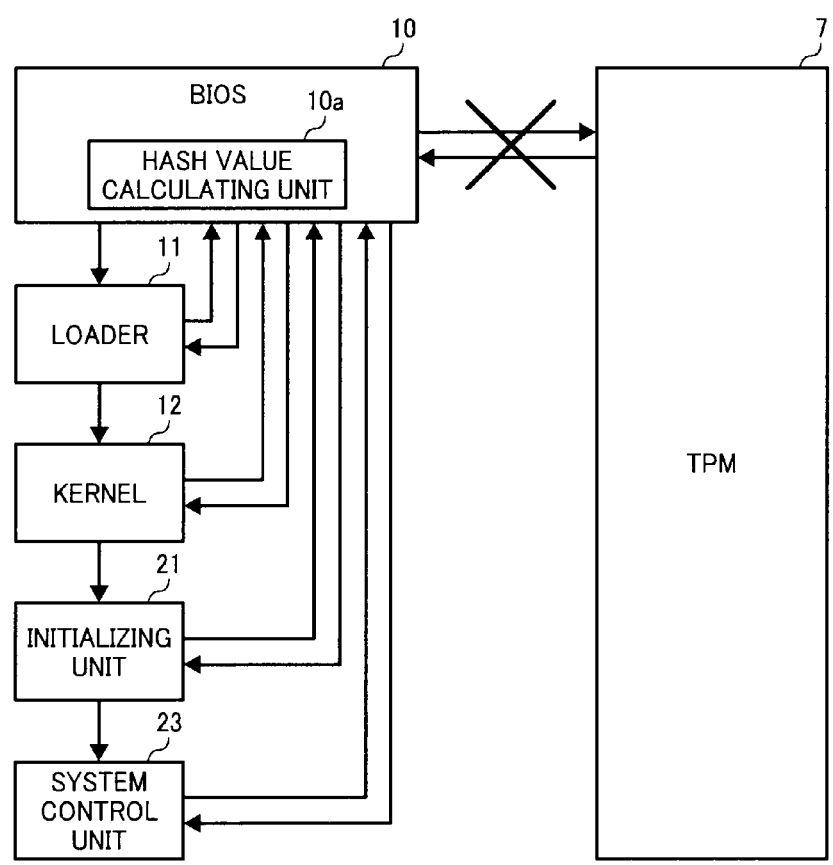
FIG. 6 is a schematic diagram for explaining an outline of a solution according to the first embodiment.

FIG. 6 is a schematic diagram for explaining an outline of a solution according to the first embodiment.

Figure 4:
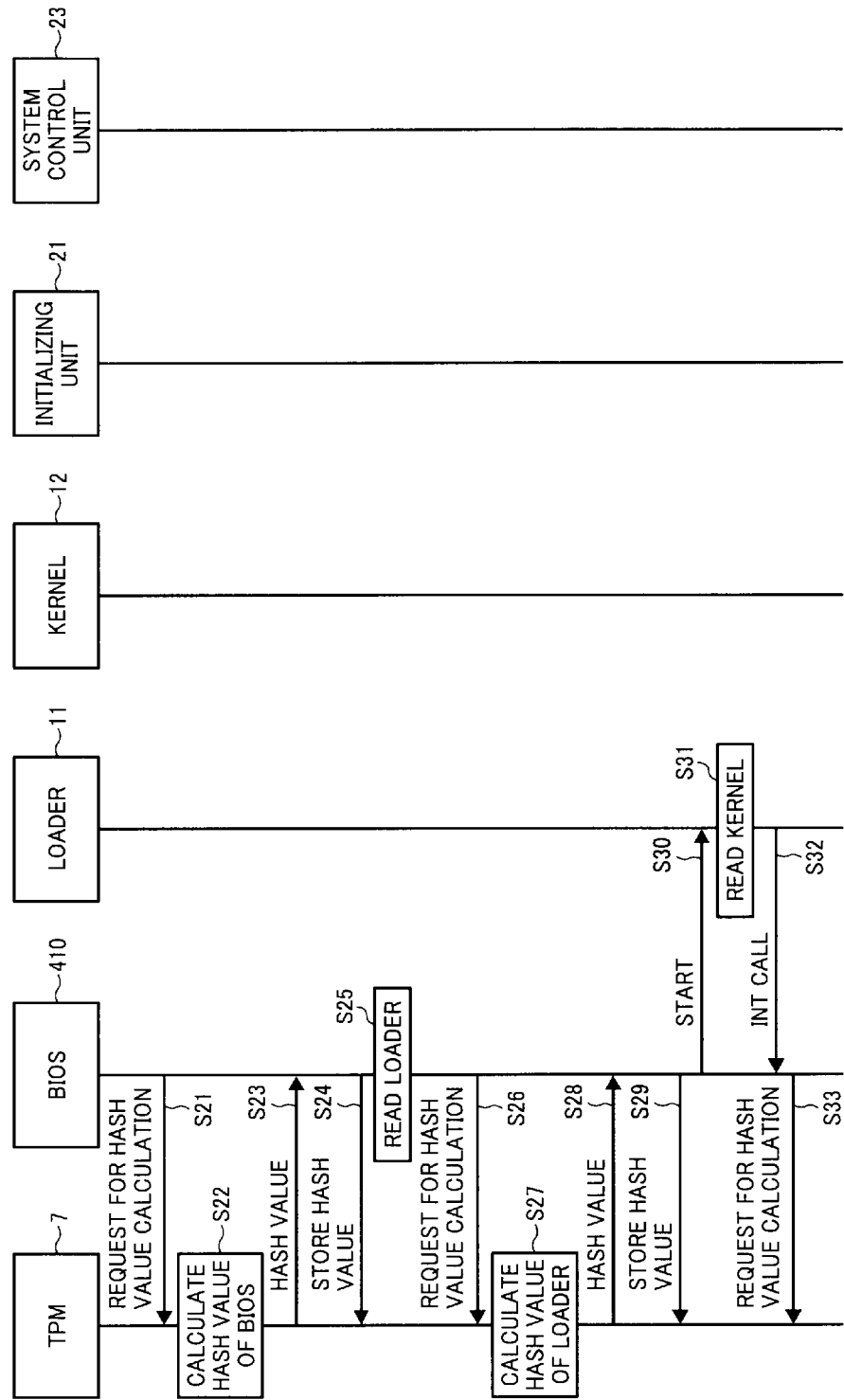
FIG. 4 is a sequence diagram of a start-up process when a TPM is operated in a conventional manner.
Figure 5:
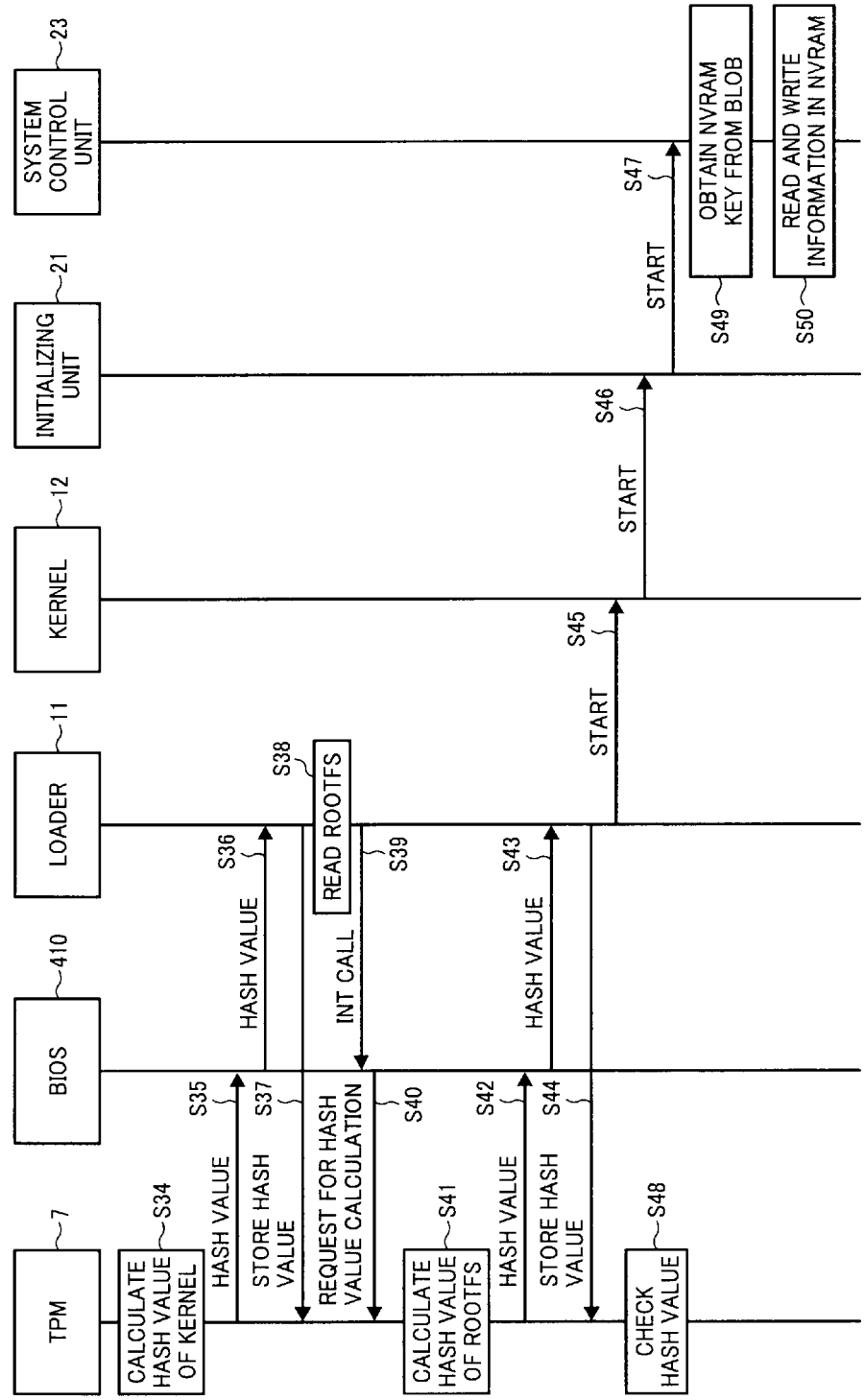
FIG. 5 is another sequence diagram of a start-up process when a TPM is operated in a conventional manner.

As shown in FIGS. 4 and 5, in the conventional method, processing requests from the BIOS 410 to the TPM 7 are transmitted the same number of times as the number of the computer programs to be started. As described above, the TPM 7 is typically connected to a low-speed bus, i.e., the bus 6.

Therefore, when the number of pieces of information of which the hash values are to be calculated is large, because a large number of computer programs are started simultaneously, or due to any other reason, it takes more time to transfer data between the BIOS 410 and the TPM 7. In other words, the total processing time of the hash value calculation increases.

To solve this problem, as shown in FIG. 6, the image forming apparatus 100 includes the hash value calculating unit 10a in the BIOS 10. This hash value calculating unit 10a performs the same hash value calculating function as that of the TPM 7. This configuration eliminates the need of the data transfer between the BIOS 10 and the TPM 7 to calculate the hash value whereby the time required for calculating the hash value is reduced.

Figure 7:
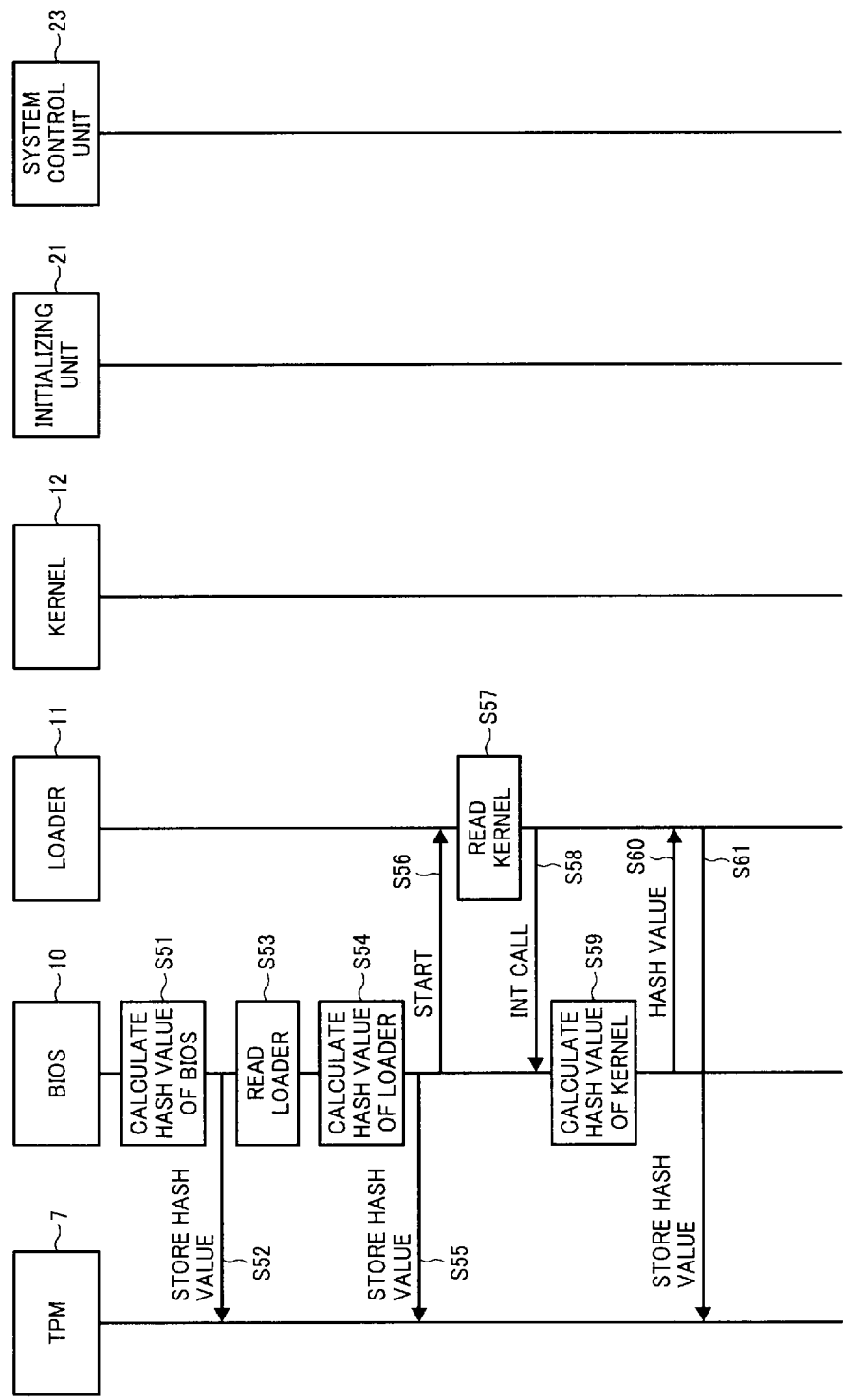
FIG. 7 is a sequence diagram of a start-up process performed by the image forming apparatus shown in FIG. 1.
Figure 8:
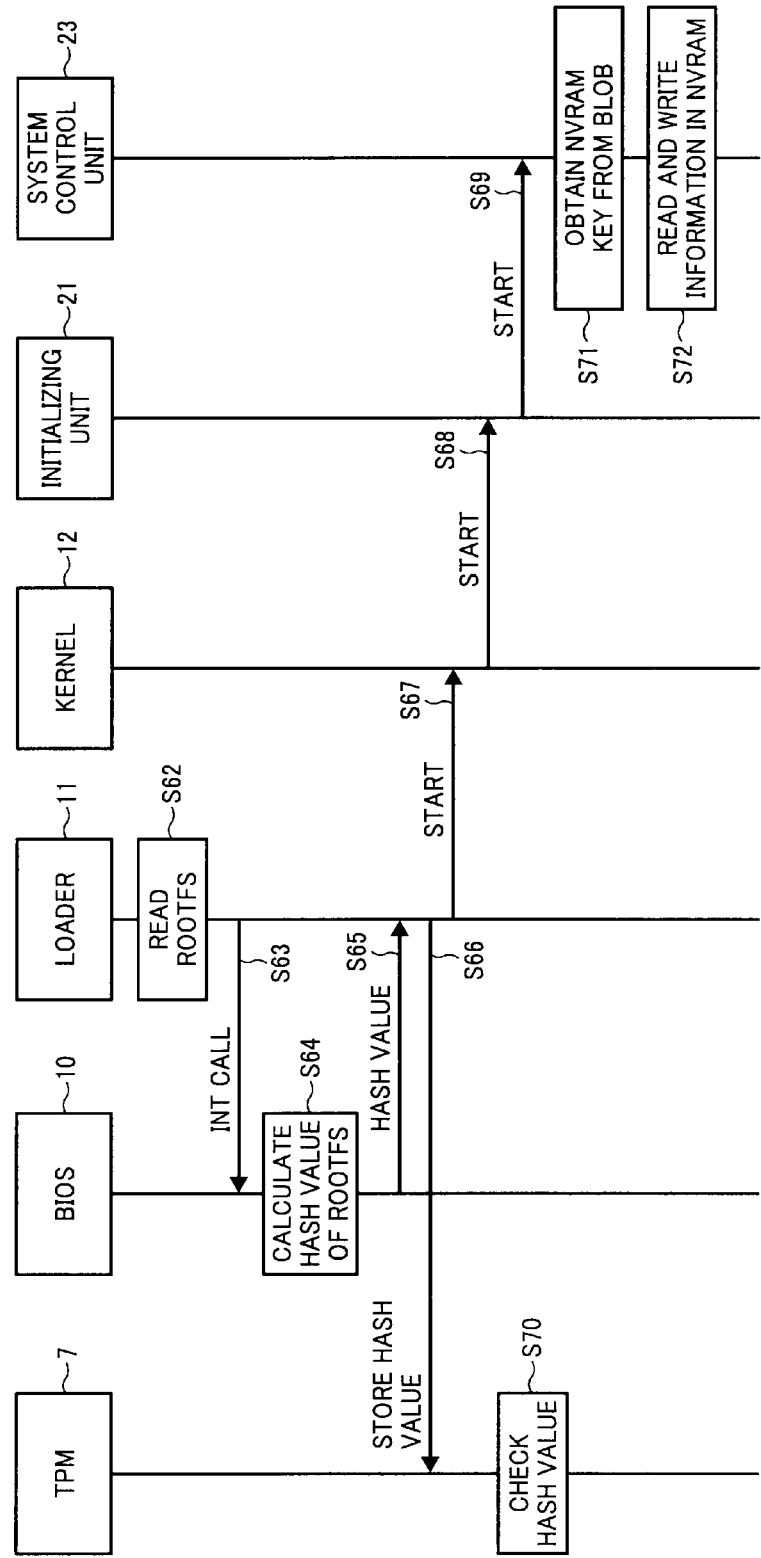
FIG. 8 is another sequence diagram of the start-up process according to the first embodiment.

FIGS. 7 and 8 are sequence diagrams of a start-up process according to the first embodiment. First, the hash value calculating unit 10a calculates the hash value of the BIOS 10 (Step S51). Next, the BIOS 10 stores the calculated hash value in the register (PCR1) corresponding to the BIOS 10 in the TPM 7 (Step S52).

The BIOS 10 reads the loader 11 from the disc 3 into the main storage device 5 (Step S53). The hash value calculating unit 10a calculates the hash value of the loader 11 (Step S54). The BIOS 10 stores the calculated hash value in the register (PCR2) corresponding to the loader 11 in the TPM 7 (Step S55).

The BIOS 10 starts the loader 11 (Step S56). The started loader 11 reads the kernel 12 from the disc 3 into the main storage device 5 (Step S57). The loader 11 requests the BIOS 10 to calculate the hash value of the kernel 12 with the INT call (Step S58).

In response to the INT call, the hash value calculating unit 10a calculates the hash value of the kernel 12 (Step S59). The BIOS 10 sends the calculated hash value back to the loader 11 that is the invoker (Step S60). The loader 11 stores the hash value in the register (PCR3) corresponding to the kernel 12 in the TPM 7 (Step S61).

The loader 11 reads the root file system 13 from the disc 3 into the main storage device 5 (Step S62). The loader 11 requests the BIOS 10 to calculate the hash value of the root file system 13 with the INT call (Step S63).

In response to the INT call, the hash value calculating unit 10a calculates the hash value of the root file system 13 (Step S64). The BIOS 10 sends the calculated hash value back to the loader 11 that is the invoker (Step S65). The loader 11 stores the hash value in the register (PCR4) corresponding to the root file system 13 in the TPM 7 (Step S66).

The steps from S67 to S72 are the same as the steps from S45 to S50 of FIG. 5, and therefore the explanations of thereof are omitted.

As shown FIGS. 7 and 8, the image forming apparatus 100 according to the first embodiment calculates the hash value in the BIOS 10. Consequently, there is no need to transfer information between the BIOS 10 and the TPM 7 to calculate the hash value. Thus, it is possible to reduce the total processing time of the hash value calculation, and to reduce the start time as the result.

In the first embodiment, the hash value calculating function is provided in the BIOS. However, there is a disadvantage that if a malicious third party tampers with a portion of the hash value calculating function in the BIOS, it is not possible to detect the tampering. For example, if the hash value calculating function is tampered such that the hash value calculating function sends back the same correct hash value as that of the computer program which is in the state before being tampered with even after the computer program is tampered with, it is also not possible to detect the tampering of the computer program, and the level of security decreases.

An image forming apparatus according to a second embodiment of the present invention verifies an authenticity of the hash calculating function in the BIOS and allows the use of the hash calculating function in the BIOS only when the authenticity is verified.

Figure 9:
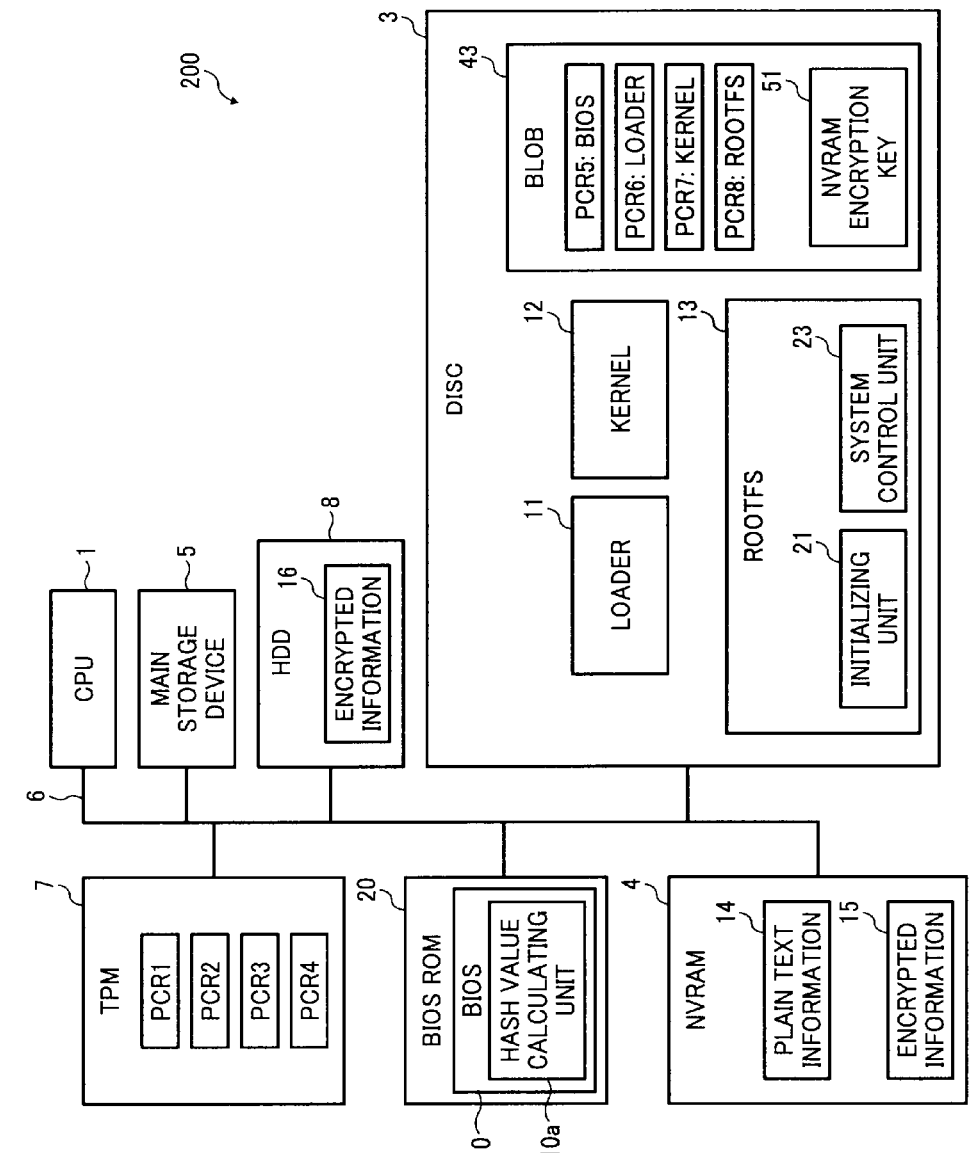
FIG. 9 is a block diagram of an image forming apparatus according to a second embodiment of the present invention.

FIG. 9 is a block diagram of an image forming apparatus 200 according to the second embodiment. As shown in the FIG. 9, the image forming apparatus 200 includes the CPU 1, a BIOS ROM 20, the disc 3, the NVRAM 4, the main storage device 5, the TPM 7, and the HDD 8. The BIOS ROM 20 includes a BIOS 910. The BIOS 910 has different functions from that of the BIOS 10 of the first embodiment. The other configurations and functions are the same as those of the first embodiment, and therefore the same reference numerals are assigned to the same components and explanations thereof are omitted.

The BIOS 910, in addition to the functions performed by the BIOS 10, performs a function to request the TPM 7 to verify the authenticity of the hash value calculating unit 10a.

Figure 10:
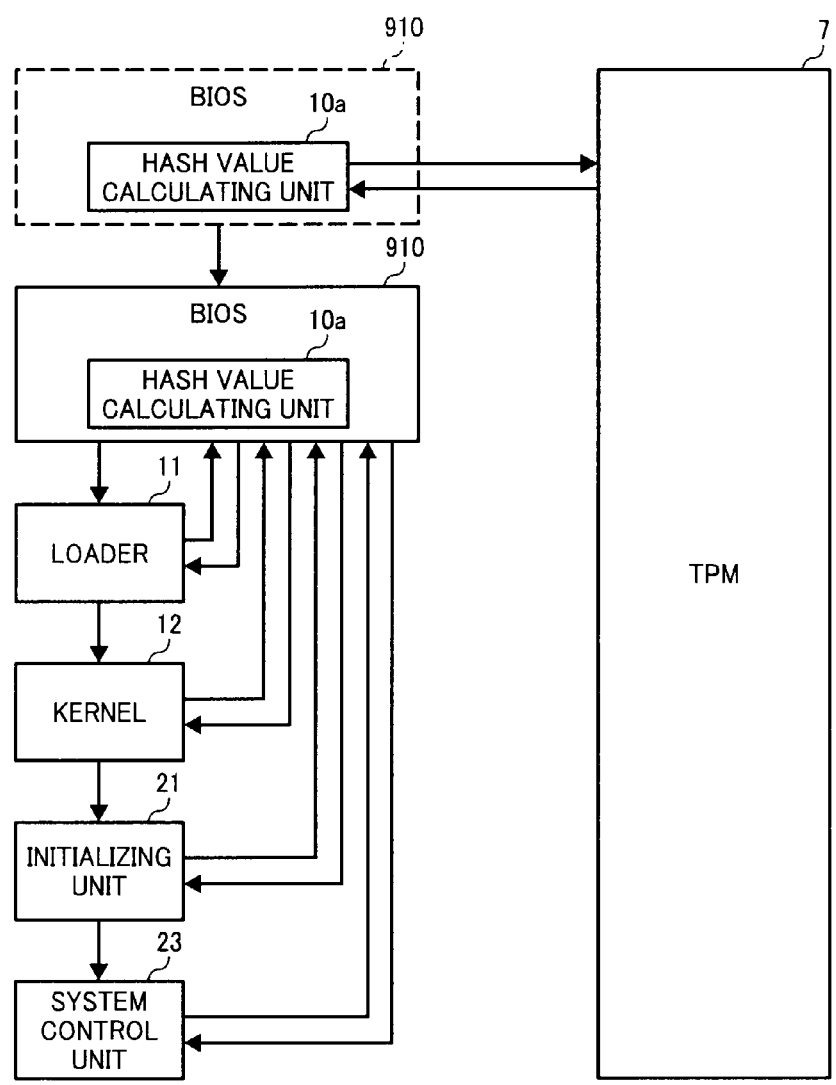
FIG. 10 is a schematic diagram for explaining an outline of a solution according to the second embodiment.

FIG. 10 is a schematic diagram for explaining an outline of the solution according to the second embodiment. As shown in FIG. 10, the has value calculating function of the TPM 7 is used only for the hash value calculating unit 10a of the BIOS 910 to verify the authenticity of the hash value calculating unit 10a. After the authenticity is verified, a hash value of another computer program is calculated by using the hash value calculating unit 10a that provides a hash value calculating function in the BIOS 910. This leads to reduction in the start time, and therefore, to maintain a high level of security.

Figure 11:
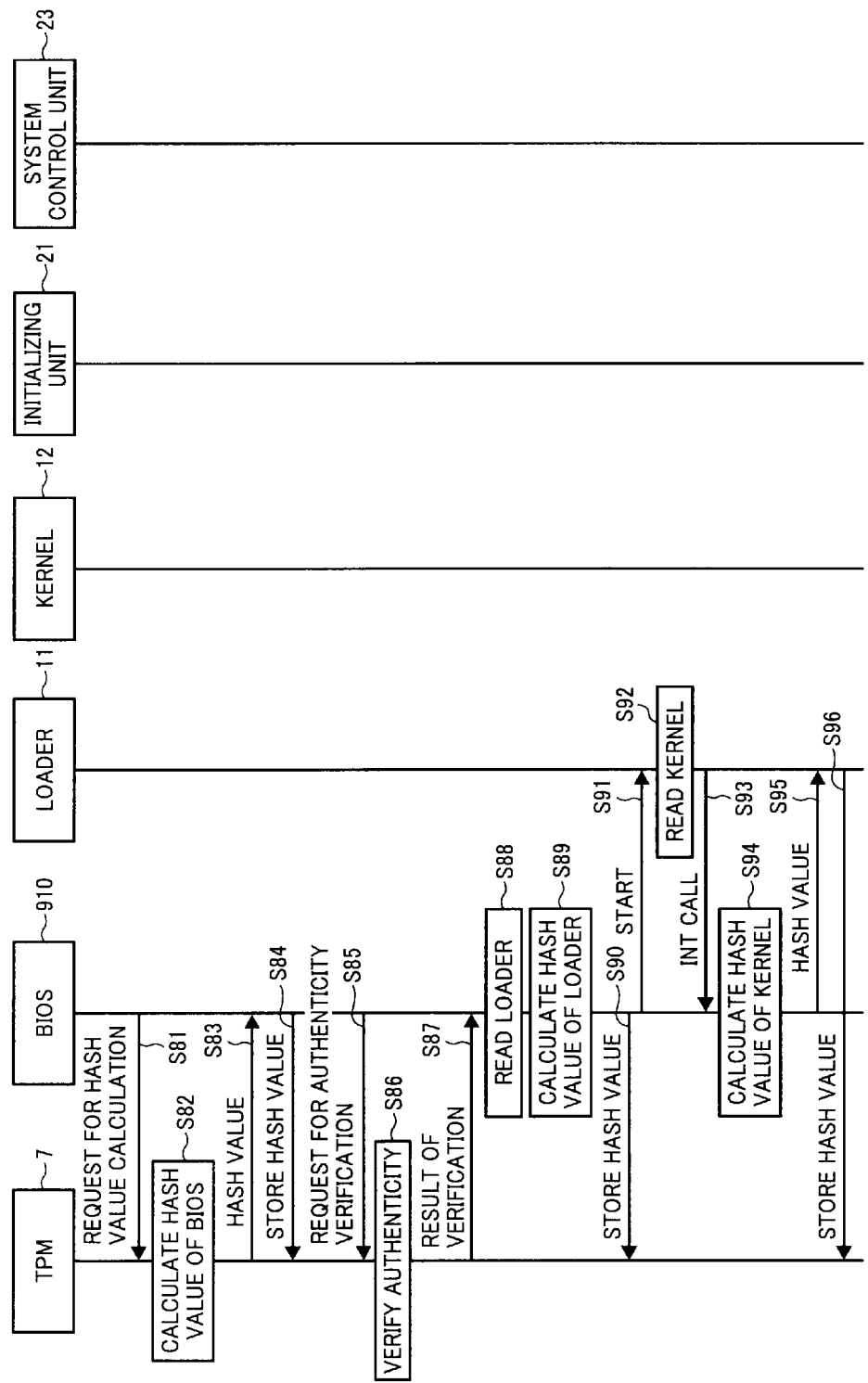
FIG. 11 is a sequence diagram of a start-up process performed by the image forming apparatus shown in FIG. 9.

FIG. 11 is a sequence diagram of a start-up process performed by the image forming apparatus 200. First, the BIOS 910 requests the TPM 7 to calculate the hash value of the hash value calculating unit 10a (Step S81). Next, the TPM 7 calculates the hash value of the hash value calculating unit 10a (Step S82) and sends the hash value back to the BIOS 910 (Step S83). The BIOS 910 stores the hash value in the register (PCR1) corresponding to the BIOS 910 in the TPM 7 (Step S84).

The BIOS 910 requests the TPM 7 to verify the authenticity of the hash value calculating unit 10a (Step S85). The TPM 7 verifies the authenticity of the hash value calculating unit 10a (Step S86) and sends the result of the verification back to the BIOS 910 (Step S87).

If the authenticity is verified, the loader 11 is read. If the authenticity is not verified, it can be configured to cancel the start-up of the image forming apparatus, or continue the processing by using the hash value calculating function of the TPM 7 as in the conventional method.

The processes from Step S88 onward are the same as those from the step S53 of the first embodiment, and therefore the explanations thereof are omitted.

As described above, the image forming apparatus 200 verifies an authenticity of the hash calculating function in the BIOS and can allow the use of the hash calculating function in the BIOS only when the authenticity is verified. Thus, even if the hash value calculating function in the BIOS is tampered with, it is possible to detect the tampering, and it can improve the security level.

In the above-mentioned embodiments, a hash value of a computer program is calculated from the entire computer program. Alternatively, a module that has no influence on an authenticity of the computer program can be included in the computer program and a hash value of the computer program can be calculated from the module. An image forming apparatus according to a third embodiment of the present invention calculates a hash value of a computer program from only a portion, i.e., a module, of the computer program.

Figure 12:
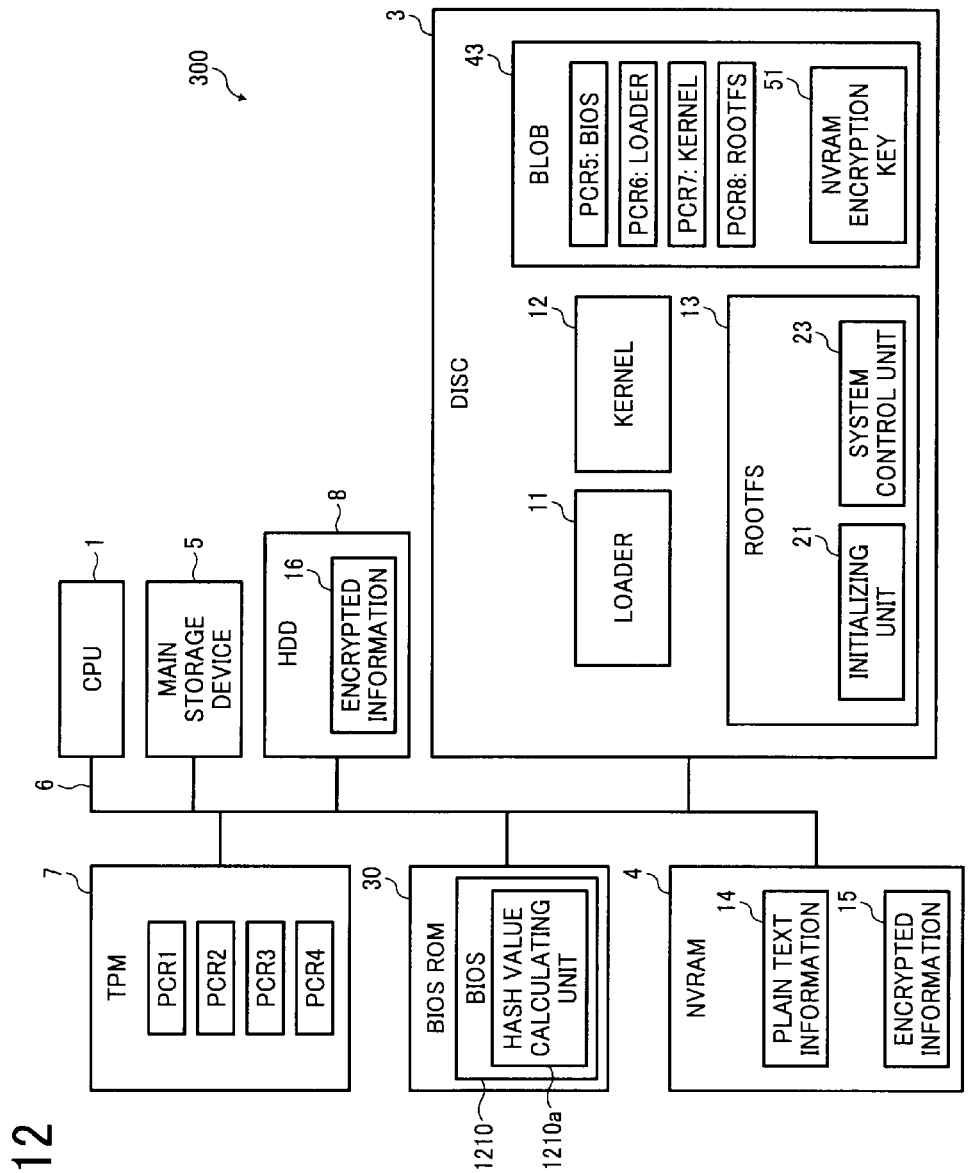
FIG. 12 is a block diagram of an image forming apparatus according to a third embodiment of the present invention.

FIG. 12 is a block diagram of an image forming apparatus 300 according to the third embodiment. The image forming apparatus 300 includes the CPU 1, a BIOS ROM 30, the disc 3, the NVRAM 4, the main storage device 5, the TPM 7, and the HDD 8. The BIOS ROM 30 includes a BIOS 1210. The BIOS 1210 includes a hash value calculating unit 121a. The hash value calculating unit 1210a has different functions from that of the BIOS 10 of the first embodiment. The other configurations and functions are the same as those of the first embodiment, and therefore, the same reference numerals are assigned to the same components, and explanations thereof are omitted.

When the hash value calculating unit 1210a calculates the hash value of the BIOS 1210, it calculates the hash value from only a predetermined module of the BIOS 1210. It can be configured to calculate the hash value from only a selected module of the computer program for even other computer programs such as the loader 11 and the kernel 12. In this case, for example, specific information that specifies a module to be processed is preliminarily stored in the hash value calculating unit 1210a, and the hash value calculating unit 1210a calculates the hash value with reference to this specific information. It can be configured to receive the specific information from the computer program that is the invoker of the hash value calculating function and calculate the hash value with reference to the specific information.

Figure 13:
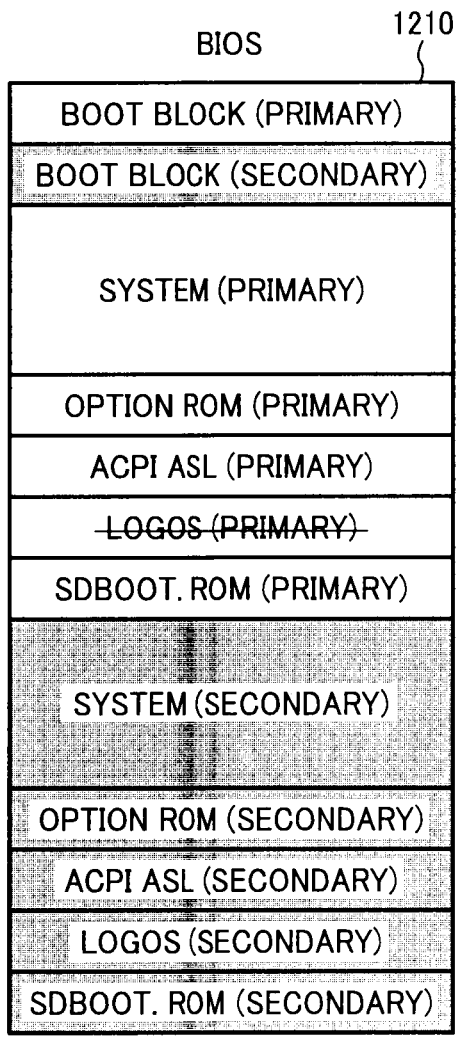
FIG. 13 is an example of a module of which a hash value is to be calculated.

FIG. 13 is a view showing an example of a module of which a hash value is to be calculated in the BIOS 1210. Specifically, the BIOS 1210 stores therein each module redundantly in two sections, primary and secondary, to provide a backup thereof. In the normal time, the primary section is activated and the secondary section is not used. Even in the primary section, there is a portion (shown with a strike-through), such as a logos, which has no effect on an operation of the BIOS 1210 even if it is tampered with.

The hash value calculating unit 1210a calculates the hash value of the BIOS 1210 from only a significant portion of the primary section. Thus, it is possible to reduce the start time.

In the embodiments mentioned above, each computer program uses the hash value calculating function of the BIOS with the INT call. In an image forming apparatus according to a fourth embodiment of the present invention, each computer program has a hash value calculating function and calculates the hash value of the computer program without using the BIOS.

Figure 14:
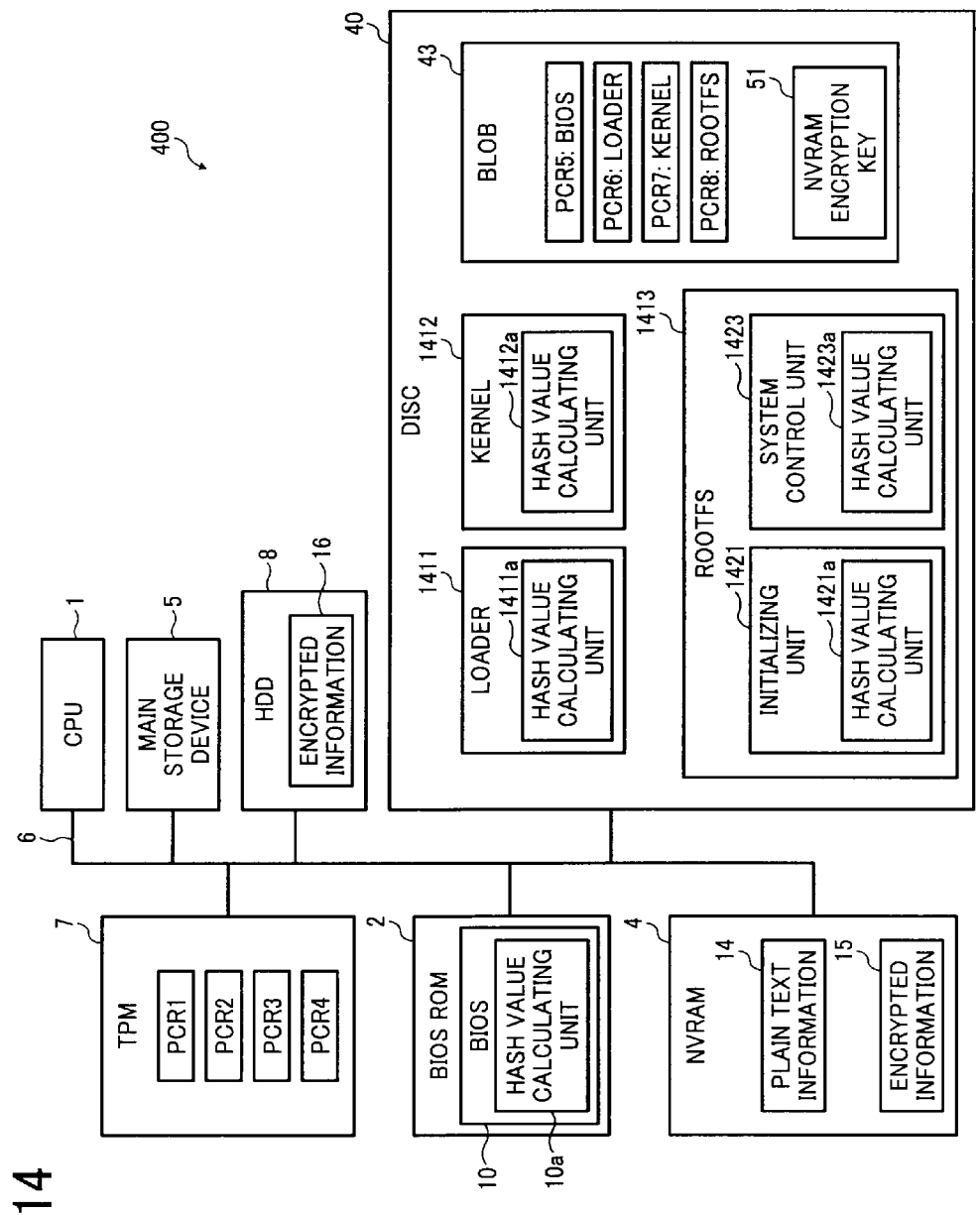
FIG. 14 is a block diagram of an image forming apparatus according to a fourth embodiment of the present invention.

FIG. 14 is a block diagram of an image forming apparatus 400 according to the fourth embodiment. The image forming apparatus 400 includes the CPU 1, the BIOS ROM 2, a disc 40, the NVRAM 4, the main storage device 5, the TPM 7, and the HDD 8.

Each computer program stored in the disc 40 has a hash value calculating unit. A loader 1411, a kernel 1412, an initializing unit 1421 of a root file system 1413, and a system control unit 1423 of the root file system 1413 have hash value calculating units 1411a, 1412a, 1421a, and 1423a, respectively. The other configurations and functions are the same as those of the first embodiment, and therefore, the same reference numerals are assigned to the same components, and explanations thereof are omitted. The each function of the hash value calculating units 1411a, 1412a, 1421a, and 1423a is the same as that of the hash value calculating unit 10a.

Figure 15:
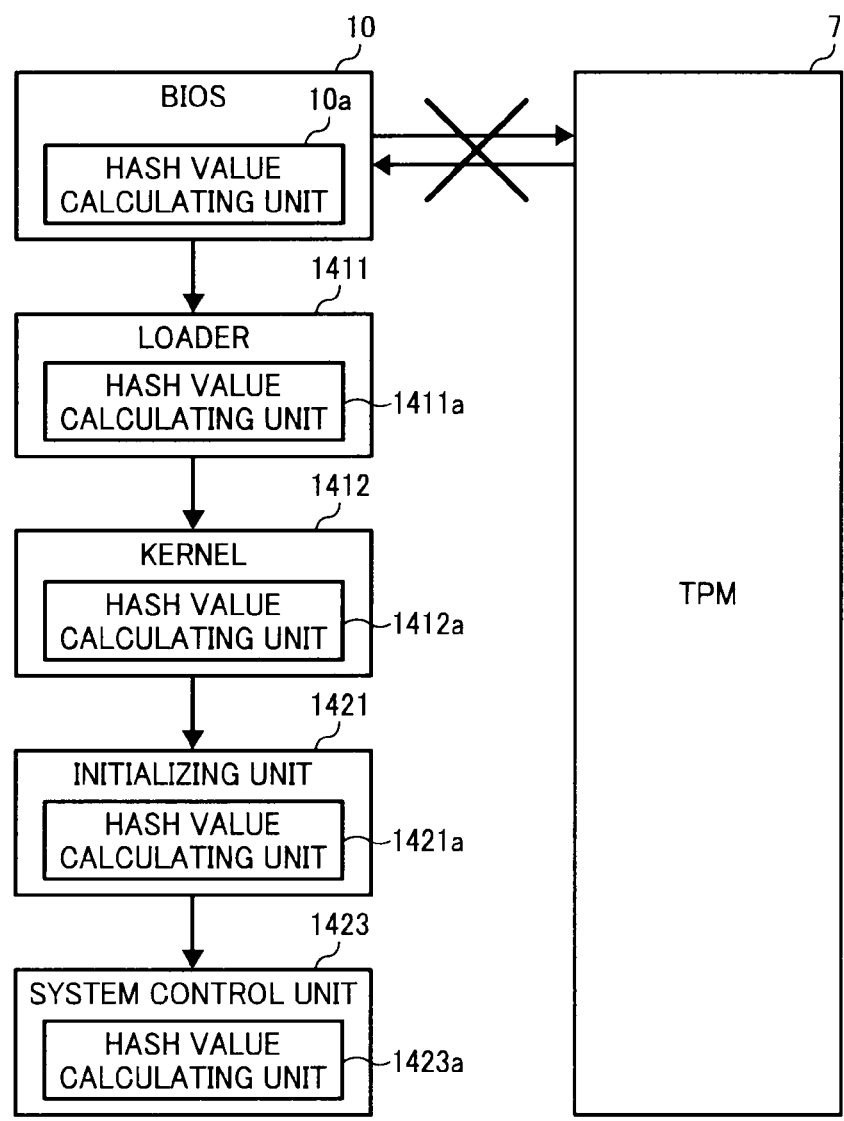
FIG. 15 is a schematic diagram for explaining an outline of a solution according to the fourth embodiment.

FIG. 15 is a schematic diagram for explaining an outline of the solution according to the fourth embodiment. In the fourth embodiment, as shown FIG. 15, the hash value calculating unit is provided in each of the computer programs, and the hash value of the computer program to be started next time is calculated by using the hash value calculating unit in the computer program that is the invoker. Because it is possible to calculate the hash value not by way of the BIOS, it is possible to start up faster.

Figure 16:
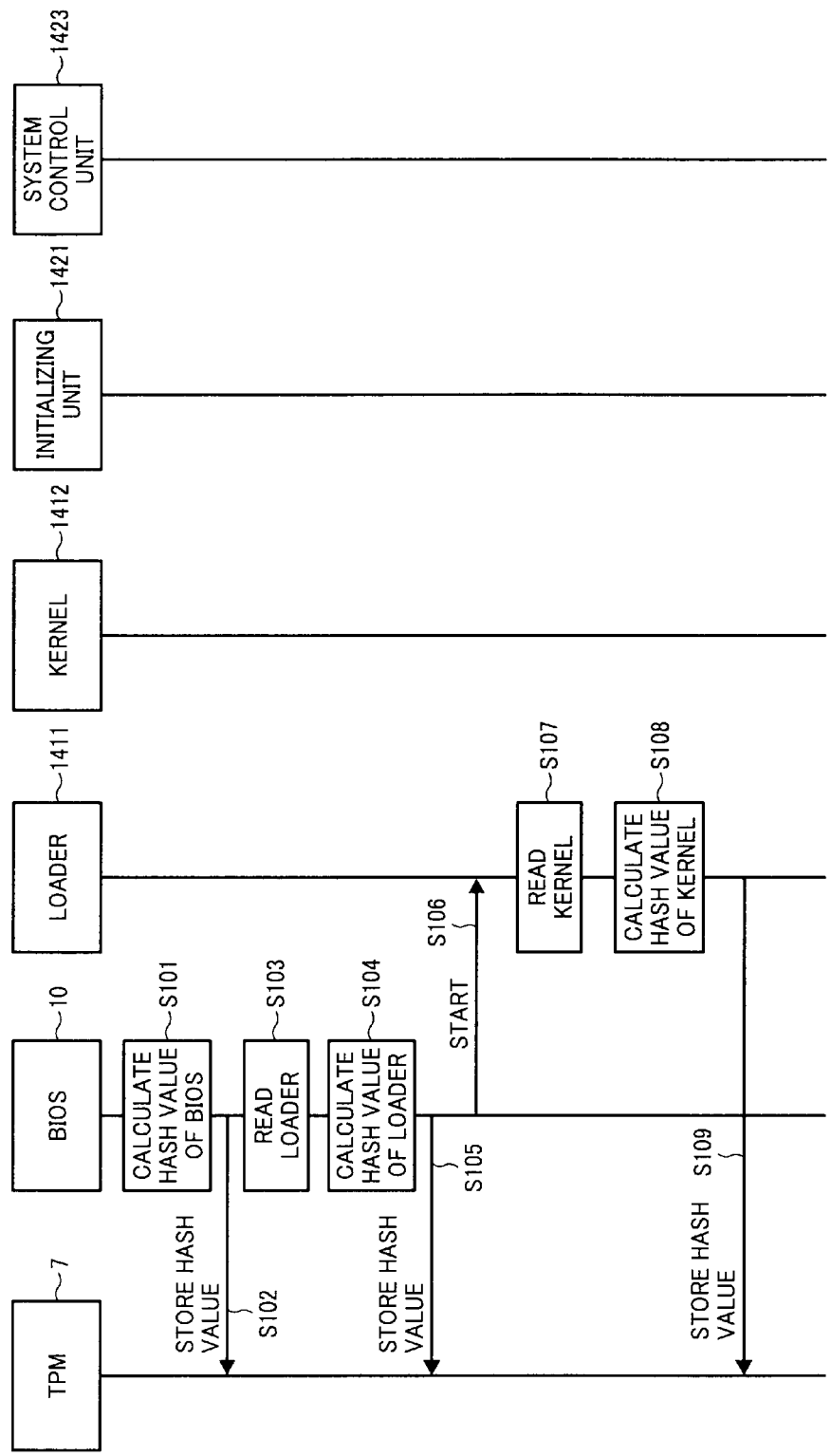
FIG. 16 is a sequence diagram of a start-up process performed by the image forming apparatus shown in FIG. 15.
Figure 17:
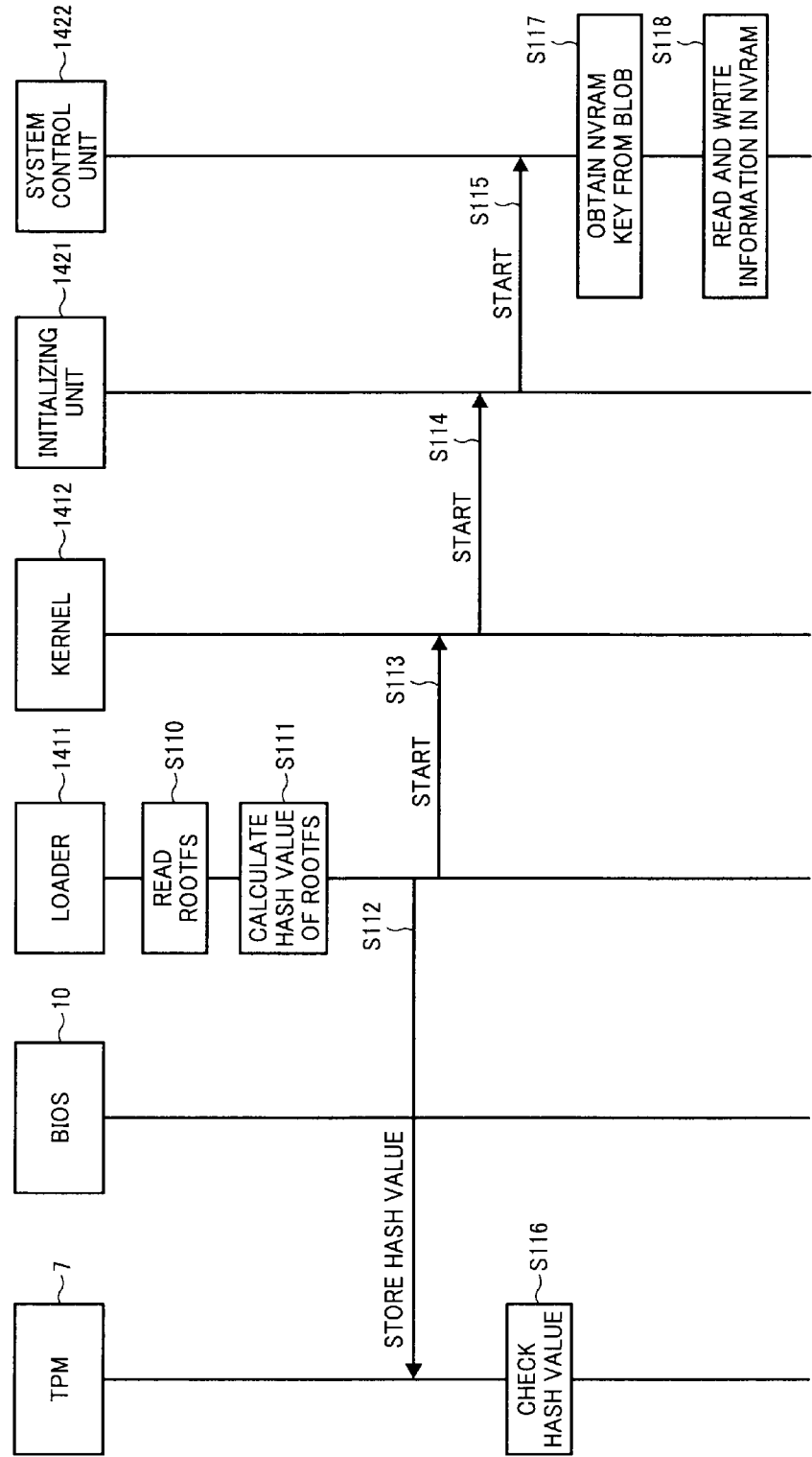
FIG. 17 is another sequence diagram of the start-up process performed by the image forming apparatus shown in FIG. 15.

FIGS. 16 and 17 are sequence diagrams of a start-up process performed by the image forming apparatus 400. The hash value calculating process of the BIOS 10, the hash value calculating process of the loader 1411, and the read process of the kernel 1412, from Step S101 to Step S107 are the same as the processes from Step S51 to Step S57 of the first embodiment, and therefore the explanations thereof are omitted.

The hash value calculating unit 1411a in the loader 1411 calculates the hash value of the kernel 1412 (Step S108). The loader 1411 stores the calculated hash value in the register (PCR3) corresponding to the kernel 1412 in the TPM 7 (Step S109). The loader 1411 reads the root file system 1413 from the disc 3 into the main storage device 5 (Step S110). The hash value calculating unit 1411a in the loader 1411 calculates the hash value of the root file system 1413 (Step S111). The loader 1411 stores the calculated hash value in the register (PCR4) corresponding to the root file system 1413 in the TPM 7 (Step S112). The processes from Step S113 to Step S118 are the same as the processes from Step S67 to Step S72 of the first embodiment, and therefore the explanations thereof are omitted.

Although omitted from FIGS. 16 and 17, when the kernel 1412 starts the initializing unit 1421, the hash value calculating unit 1412a in the kernel 1412 calculates the hash value of the initializing unit 1421 and stores the hash value in the TPM 7. In the same manner, when the initializing unit 1421 starts the system control unit 1423, the hash value calculating unit 1421a in the initializing unit 1421 calculates the hash value of the system control unit 1423 and stores it in the TPM 7.

As described above, in the image forming apparatus 400, because each of the computer programs has the hash value calculating function and the hash value of the computer program to be started can be calculated in each of the computer programs without using the BIOS, it is possible to start up faster.

An authenticity verifying program executed by the image forming apparatus according to each of the first, second, third, and fourth embodiments is provided in such a manner that the authenticity verifying program is stored, in a form of a file that is installable and executable on a computer, in a recording medium readable by the computer, such as a compact disk-read only memory (CD-ROM), a flexible disk (FD), a compact disk-recordable (CD-R), or a digital versatile disk (DVD).

Alternatively, the authenticity verifying program can be provided in such a manner that the authenticity verifying program is stored in another computer connected to the computer via a network such as the Internet, and downloaded to the computer via the network. The authenticity verifying program can be delivered or distributed via a network such as the Internet.

Moreover, the authenticity verifying program can be delivered or distributed, for example, in a state preinstalled in a recording medium such as a ROM.

The authenticity verifying program executed by the image forming apparatus is, for example, made up of modules that implement the above-described units, i.e., the BIOS, the loader, and the kernel. For actual hardware implementation, the CPU (processor) reads the authenticity verifying program from the recording medium and executes the read authenticity verifying program, so that the above-described units are loaded and created on a main storage device. Thereby, the above-described units are implemented on the main storage device.

According to an aspect of the present invention, because a starting unit calculates a hash value of the starting unit and a hash value of a computer program to be started and stores the hash values, there is no need to transfer information between the starting unit and a security unit connected to the starting unit by a low-speed bus and for the security unit to calculate the hash value. Thus, it is possible to reduce a start time while improving a security of an information processor.

It will be apparent to those skilled in the art that various modifications and variations can be made in the present invention. Thus, it is intended that the present invention covers the modifications and variations of this invention provided they come within the scope of the appended claims and their equivalents. The present invention is not exactly limited to the above embodiments, and components can be modified in the implementation phase without departing from the spirit and scope of the invention. Various inventions can be formed by properly combining a plurality of components disclosed in the above embodiments. For example, several components may be omitted from all the components described in the embodiments. In addition, components throughout different embodiments may be properly combined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processor comprising:
a first storage unit that stores therein a plurality of computer programs to be started;
a starting unit that is started when the information processor is started and starts a first computer program among the plurality of programs;
a security unit that is connected to the starting unit and has a register in which hash values of the computer programs are stored;
a processing unit that operates processes by executing the plurality of computer programs; and
a second storage unit that stores therein the hash values of the computer programs and a hash value of the starting unit in advance and stores encrypted information, wherein
the starting unit includes a first hash value calculating unit that performs a hash value calculating process to calculate hash values of the starting unit and the first computer program and to store the hash values in the register of the security unit,
the security unit verifies an authenticity of the first hash value calculating unit in the starting unit, compares the hash values stored in the register in the hash value calculating process of the starting unit verified by the security unit with the hash values stored in the second storage unit, and decrypts the encrypted information from the second storage unit if the hash values agree with each other, and
after the security unit verifies authenticity of the first hash value calculating unit, a result of the verification is sent from the security unit to the starting unit.

2. The information processor according to claim 1, wherein the first hash value calculating unit calculates a hash value of a part of the starting unit.

3. The information processor according to claim 1, wherein the security unit is a secure tamper resistant device.

4. The information processor according to claim 1, wherein when the authenticity of the first hash value calculating unit is verified, a loader in the first storage unit is read.

5. The information processor according to claim 1, wherein if the authenticity of the first hash value calculating unit is not verified, start-up of an image forming apparatus is canceled.

6. A method for verifying an authenticity performed on an information processor, the information processor comprising:
> a first storage unit that stores therein a plurality of computer programs to be started;
> a starting unit that starts a first computer program among the plurality of computer programs, and the starting unit includes a first hash value calculating unit that performs a hash value calculating process to calculate hash values of the starting unit and the first computer program;
> a security unit that is connected to the starting unit and has a register in which hash values of the computer programs are stored; and
> a second storage unit that stores therein the hash values of the computer programs and a hash value of the starting unit in advance and stores encrypted information, and the method comprising:
> starting the first computer program by the starting unit when the information processor is started;
> executing a processing unit as the first computer program by the starting unit;
> performing a hash value calculating process for calculating hash values of the starting unit and the first computer program and storing the hash values in the register of the security unit by the starting unit;
> verifying, by the security unit, an authenticity of the first hash value calculating unit in the starting unit;
> comparing, by the security unit, the hash values stored in the register in the hash value calculating process of the starting unit verified by the security unit with the hash values stored in the second storage unit, and decrypting the encrypted information from the second storage unit if the hash values agree with each other; and
> sending a result of the verification is sent from the security unit to the starting unit, after the security unit verifies authenticity of the first hash value calculating unit.

7. A computer program product that includes a non-transitory computer-readable recording medium and a computer program stored in the non-transitory computer-readable recording medium, the computer program when executed on a computer causes the computer to execute a method for verifying an authenticity performed on an information processor, the information processor comprising:
> a first storage unit that stores therein a plurality of computer programs to be started;
> a starting unit that starts a first computer program among the plurality of computer programs, and the starting unit includes a first hash value calculating unit that performs a hash value calculating process to calculate hash values of the starting unit and the first computer program;
> a security unit that is connected to the starting unit and has a register in which hash values of the computer programs are stored; and
> a second storage unit that stores therein the hash values of the computer programs and a hash value of the starting unit in advance and stores encrypted information, and the computer program causes the computer to execute:
> starting the first computer program by the starting unit when the information processor is started;
> executing a processing unit as the first computer program by the starting unit;
> performing a hash value calculating process for calculating hash values of the starting unit and the first computer program and storing the hash values in the register of the security unit by the starting unit;
> verifying, by the security unit, an authenticity of the first hash value calculating unit in the starting unit;
> comparing, by the security unit, the hash values stored in the register in the hash value calculating process of the starting unit verified by the security unit with the hash values stored in the second storage unit, and decrypting the encrypted information from the second storage unit if the hash values agree with each other; and
> sending a result of the verification is sent from the security unit to the starting unit, after the security unit verifies authenticity of the first hash value calculating unit.

\* \* \* \* \*